US008801300B2

(12) United States Patent
Arao et al.

(10) Patent No.: US 8,801,300 B2
(45) Date of Patent: Aug. 12, 2014

(54) FIBER OPTIC CABLE END FIXTURE AND FIBER OPTIC CABLE END FIXING METHOD (75) Inventors: Hajime Arao, Yokohama (JP); Kiyoshi Kato, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/697,423

(22) PCT Filed: May 12, 2011

(86) PCT No.: PCT/JP2011/060996
§ 371 (c)(1),
(2), (4) Date: Nov. 12, 2012

(87) PCT Pub. No.: WO2011/142436
PCT Pub. Date: Nov. 17, 2011

(65) Prior Publication Data
US 2013/0058612 A1 Mar. 7, 2013

(30) Foreign Application Priority Data

May 14, 2010 (JP) .................................. 2010-111911
Nov. 26, 2010 (JP) .................................. 2010-263161

(51) Int. Cl.
*G02B 6/36* (2006.01)
*G02B 6/00* (2006.01)

(52) U.S. Cl.
USPC .................. 385/77; 385/87; 385/92; 385/139

(58) Field of Classification Search
USPC ...................... 385/76–78, 81, 84, 87–92, 139
See application file for complete search history.

(56) References Cited

U.S. PATENT DOCUMENTS 5,418,874 A * 5/1995 Carlisle et al. .................. 385/76

FOREIGN PATENT DOCUMENTS

| JP | 3-24607 | 3/1991 |
| JP | 5-96807 | 12/1993 |
| JP | 2010-26475 | 2/2010 |
| WO | 2010/004772 | 1/2010 |
| WO | 2011/052352 | 5/2011 |

* cited by examiner

*Primary Examiner* — Uyen Chau N Le
*Assistant Examiner* — Michael Mooney
(74) *Attorney, Agent, or Firm* — Drinker Biddle & Reath LLP (57) ABSTRACT

A fiber optic cable fixture 1 has a joint member 3, a swaging member 4, and a fastening member 5. The joint member 3 has a cylindrical shape in which a through hole 10 is formed and includes a joint section 11 joined to another member, a male screw 12, and a cylindrical section 13 that is smaller in diameter than the male screw 12 and that is covered with a jacket 7 and tension fibers. The swaging member 4 is fitted to the cylindrical section 13 while covered with the jacket 7. A female screw 16 is formed at one end of an inner peripheral surface of the fastening member 5. A tapered surface 17 is formed on another end of the inner peripheral surface of the fastening member 5.

7 Claims, 6 Drawing Sheets

FIBER OPTIC CABLE END FIXTURE AND FIBER OPTIC CABLE END FIXING METHOD

TECHNICAL FIELD

The present invention relates to a fiber optic cable end fixture for fixing a fiber optic cable to a housing, or the like, of optical equipment, as well as to a fiber optic cable end fixing method.

BACKGROUND ART

Figures 7, 8:
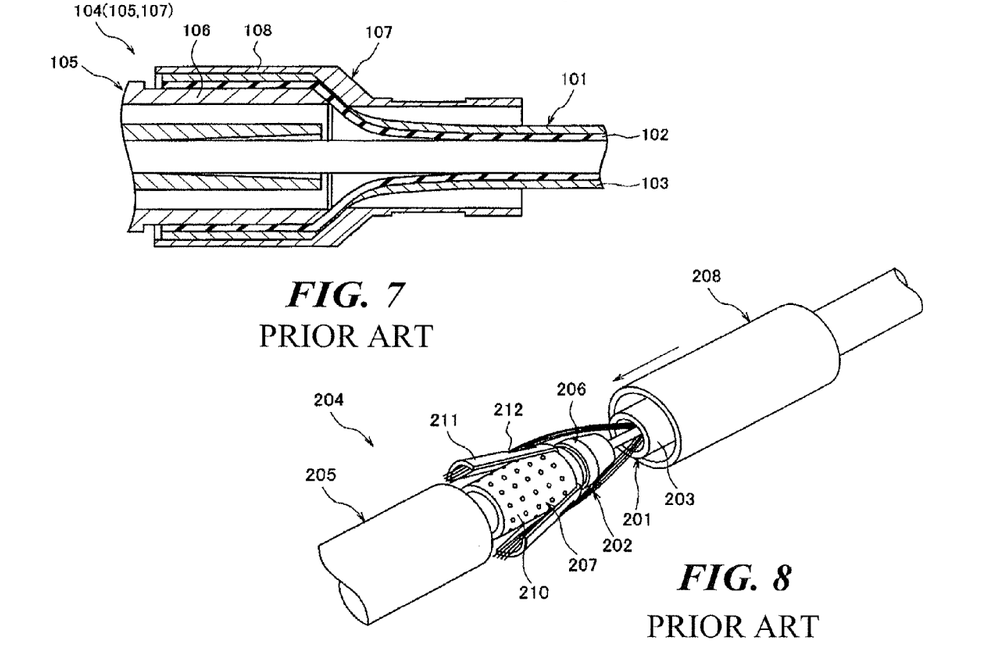
FIG. 7 illustrates an example of a related art technique.
FIG. 8 illustrates another example of the related art technique.

As shown in FIG. 7, Patent Document 1 discloses a fiber optic cable end fixture 104 for a fiber optic cable 101 that simultaneously fixes both tension fibers 102 and a jacket 103 of the fiber optic cable 101 with a single member. Specifically, a swaging section 108 of a swaging ring 107 is adapted to surround the jacket 103 and the tension fibers 102 laid therebelow which are positioned on a guide section 106 of a stop ring 105, thereby simultaneously swaging and fixing both the tension fibers 102 and the jacket 103.

For example, as shown in FIG. 8, Patent Document 2 discloses an end fixture 204 that fixes tension fibers 202 and a jacket 203 of a fiber optic cable 201. The end fixture 204 has an optical connector 205, a cylindrical support member 207 fitted into a fixing section 206 of the optical connector 205, and a fixing ring 208.

The cylindrical support member 207 includes a cylindrical section 210 and plate-like turn-back pieces 211. The jacket 203 of the fiber optic cable 201 is fitted around the fixing section 206, and the tension fibers 202 are nipped between an outer periphery of the cylindrical section 210 and the turn-back pieces 211 via respective windows 212 of the turn-back pieces 211. Next, the jacket 203 and the tension fibers 202 are secured by moving the fixing ring 208 up to the fixing section 206 and the cylindrical support member 207 and subsequently swaging the fixing ring 208.

RELATED ART

Patent Documents

Patent Document 1: JP-2010-26475-A
Patent Document 2: JP-UM-H03-024607-A

SUMMARY OF THE INVENTION

Problem that the Invention is to Solve

In Patent Document 1, the jacket 103 and the tension fibers 102 in a superposed state are simultaneously fixed by the swaging section 108 of the swaging ring 107. Hence, fixing work is simple; however, the tension fibers 102 often slide over the jacket 103 and become loosened. In Patent Document 2, the fixing ring 208 is fixedly swaged while the tension fibers 202 of the fiber optic cable 201 are nipped between the outer periphery of the cylindrical section 210 of the cylindrical support member 207 and the turn-back pieces 211. Therefore, the tension fibers 202 in a secured state hardly become loosened, but the tension fibers 202 must be manually passed through the respective windows 212. Thus, fixing operation becomes complicate.

The present invention has been conceived in light of the circumstances and aims at providing a fiber optic cable end fixture and a fiber optic cable end fixing method that enable fixing of an end portion of a fiber optic cable with simple operation and that prevent fixed tension fibers from becoming loosened.

Means for Solving the Problem

In view of the above mentioned problems, the present invention provides a fiber optic cable end fixture for securing an end of a fiber optic cable, the fiber optic cable comprising: an optical fiber section; tension fibers enclosing the optical fiber; and a jacket covering the tension fibers, the fixture comprising: a joint member; a swaging member; and a fastening member, wherein the joint member has a cylindrical shape in which a through hole that allows insertion of the optical fiber section is formed, the joint member having: a joint section to be joined to another member; a male screw along which exposed end portions of the tension fibers are laid; and a cylindrical section to be covered with the jacket and the tension fibers. the cylindrical section being smaller in diameter than the male screw, wherein the swaging member has a ring shape and is fitted to the cylindrical section which is covered with the jacket and the tension fibers, wherein the fastening member has a cylindrical shape and has a female screw at one end of an inner peripheral surface thereof so as to be screw-engaged with the male screw along which the end portions of the tension fibers are laid, and wherein a tapered surface for swaging the swaging member is formed on at least one of the other end the inner peripheral surface of the fastening member or an outer peripheral surface of the swaging member.

A swaging facilitation notch may be formed in the swaging member. A guide groove for laying the end portions of the tension fibers around the male screw along a circumferential direction may be formed in the male screw of the joint member. A recess and a protrusion that are engageable with each other may be formed in the swaging member and the joint member, respectively. A protruding piece that is engageable with the guide groove of the male screw of the joint member may be formed in the swaging member. The joint member may be formed from a metal.

The present invention also provides a fiber optic cable end fixing method for securing an end of a fiber optic cable to a housing of an optical equipment by use of a fiber optic cable end fixture, the fiber optic cable comprising: an optical fiber section; tension fibers enclosing the optical fiber section; and a jacket covering the tension fibers, the fixture comprising: a joint member; a swaging member; and a fastening member, the method comprising: inserting the optical fiber section of the fiber optic cable into a through hole of the joint member having a cylindrical shape, the joint member having: a joint section to be joined to the housing of the optical equipment, a male screw, and a cylindrical section that is smaller in diameter than the male screw, while covering the small-diameter cylindrical section with the tension fibers and the jacket; laying end portions of the tension fibers exposed from an end of the jacket around a screw-engagement face of the male screw along a circumferential direction via a guide groove formed in the male screw; fitting the ring-shaped swaging member around an outside of the jacket covering the small-diameter cylindrical section of the joint member; and screw-engaging the cylindrical fastening member having: a female screw that is engageable with the male screw along which the end portions of the tension fibers are laid; and a tapered surface for swaging the swaging member.

Advantage of the Invention

According to the present invention, tension fibers of the fiber optic cable are fixed and nipped between the male screw of the joint member and the female screw of the fastening member, whereby the fixed tension fibers become hardly loosened and can be secured with high holding strength. Further, when the male screw of the joint member is screw-engaged with the female screw of the fastening member, the tapered surface swages the swaging member. Thus, the end of the fiber optic cable can be readily secured by one operation for fastening the fastening member to the joint member.

EMBODIMENT FOR IMPLEMENTING THE INVENTION

Figure 1A:
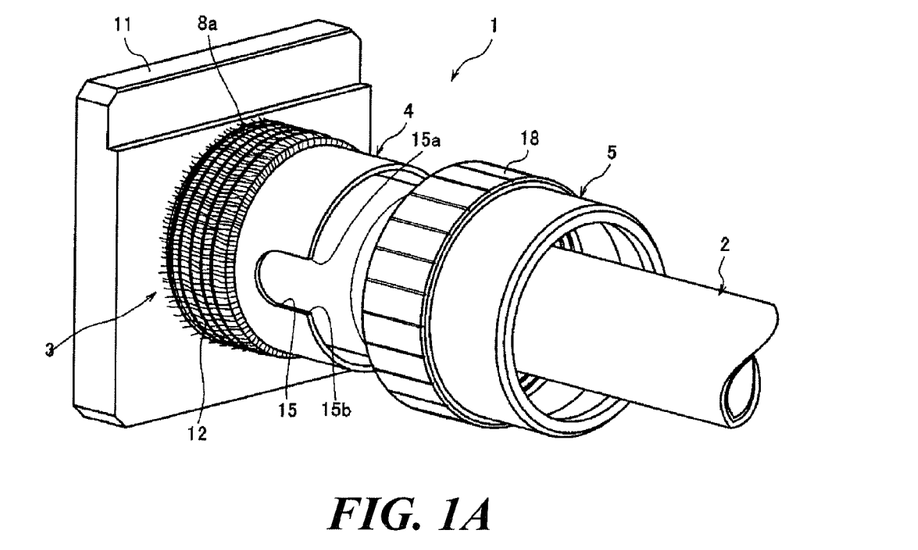
FIGS. 1A and 1B illustrate an example fiber optic cable end fixture of the present invention.
Figure 1B:
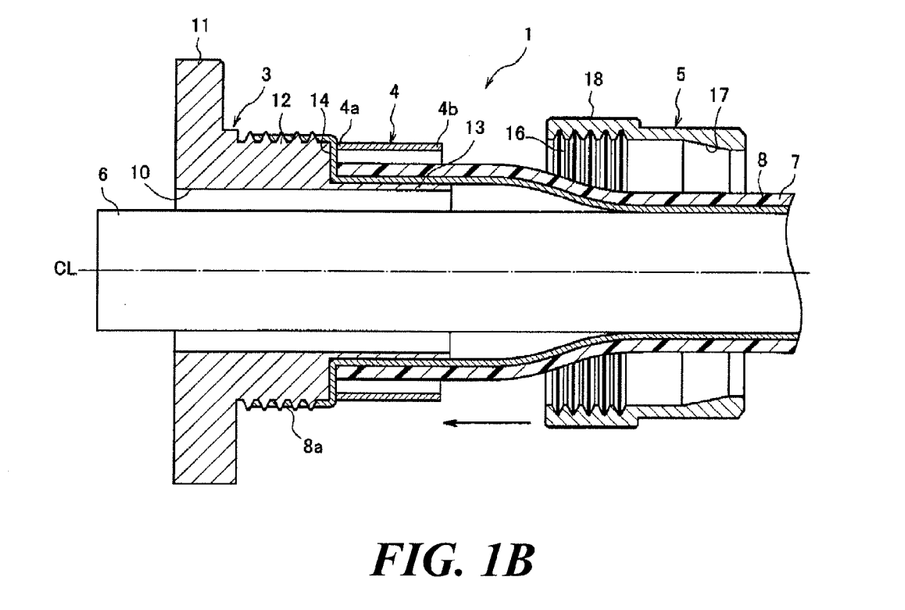

By reference to FIGS. 1A and 1B, a fiber optic cable end fixture of the present embodiment will be described. FIG. 1A illustrates a state where a constituent component of the fiber optic cable end fixture is provided at an end of a fiber optic cable. FIG. 1B illustrates an axial cross section of the fiber optic cable end fixture shown in FIG. 1A.

A fiber optic cable end fixture 1 holds and secures an end of a fiber optic cable 2, and includes a joint member 3, a swaging member 4, and a fastening member 5. The fiber optic cable 2 has an optical fiber section 6, a jacket 7 that covers the optical fiber section 6, and tension fibers 8 interposed between the optical fiber section 6 and the jacket 7. The optical fiber section 6 is an aggregate of multicore optical fibers but not limited thereto.

The joint member 3 is joined to a housing of optical equipment, or the like, to be supported, and guides an insertion of a fiber optic cable into the optical equipment. The joint member 3 has a cylindrical shape, and a through hole 10 into which the optical fiber section 6 is inserted is formed in the joint member 3. The joint member 3 is formed from, for example, a conductive metallic material. On a radial outer portion of the joint member 3, joint section 11, a male screw 12, and a cylindrical section 13 whose outside diameter is smaller than that of the male screw 12 are integrally formed, in this order, along a center line CL.

The through hole 10 is formed to pass through the joint member 3 with a uniform diameter, and allows insertion of the optical fiber section 6 of the fiber optic cable 2. The joint section 11 has, for example, a rectangular shape so as to radially outwardly extend, and is joined to a housing of optical communication equipment, or the like, (i.e., a member to which the joint section is to be joined). The male screw 12 is concentric with the center line CL of the through hole 10, and is formed at a middle of the joint member 3. During securing of the end of the fiber optic cable 2, the tension fibers 8 are extended further from an end of the jacket 7, and end portions 8a of the tension fibers 8 are exposed. The male screw 12 is provided along an area along which the exposed end portions 8a of the tension fibers 8 are to be laid.

The cylindrical section 13 is formed in a cylindrical shape concentric with the center line CL of the through hole 10, and the cylindrical section 13 is thinner than the male screw 12 and smaller in outside diameter than the male screw 12. The cylindrical section 13 is an area to be covered with the jacket 7 and the tension fibers 8 when the end of the fiber optic cable 2 is secured. The cylindrical section 13 is smaller in outside diameter than the male screw 12 and is smaller in thickness than the male screw 12, so that a step 14 is provided in a border between the male screw 12 and the cylindrical section 13.

The swaging member 4 is formed from a metallic material, such as aluminum, and into a ring shape. When swaged, the swaging member 4 secures the jacket 7 and the tension fibers 8 lying under the jacket 7 to the joint member 3. In FIG. 1B, the center line of the swaging member 4 is arranged so as to match the center line CL of the through hole 10. The swaging member 4 is secured such that, while one end 4a of the swaging member 4 contacts the step 14 via the tension fibers 8, a remaining end 4b is swaged. In order to facilitate swaging of the swaging member 4, a U-shaped notch 15 is formed in the other end 4b. In the present embodiment, two notches 15 are formed at positions on the end 4b that are symmetrical about the center line CL.

As a result of forming the U-shaped notches 15 in the swaging member 4, sharp edges 15a and 15b for biting into the jacket 7 by being swaged are provided, thereby securing the swaging member 4. The swaging member 4 has an inner diameter that enables fitting of the swaging member 4 with play around the cylindrical section 13 of the joint member 3 covered with the jacket 7. While the present embodiment is exemplified with the two swaging facilitation cutout 15, the present invention is not limited to the example. The number of swaging facilitation notches 15 can be arbitrarily set.

By forming the swaging member 4 into a ring shape, the jacket 7 and the tension fibers 8 can be uniformly secured to the fiber optic cable 2 along a circumferential direction. Specifically, even when split state of the jacket 7 or a bundled state of the tension fibers 8 is changed during securing work, the jacket 7 and the tension fibers 8, as a whole, can be secured stably.

The fastening member 5 is formed in a hollow cylindrical shape as shown in FIG. 1B and arranged such that the center of the fastening member 5 coincides with the center line CL of the through hole 10. A female screw 16 is made at one end of an inner circumference of the fastening member 5 with respect to the center line CL direction, and screw-engages the end portions 8a of the tension fibers 8 nipped therebetween with the male screw 12 of the joint member 3. A tapered surface 17 is formed on the other side of the inner circumference of the fastening member 5, such that an inner diameter of the fastening member 5 gradually becomes smaller toward the other side along the center line CL direction.

The inner diameter of the fastening member 5 is such that one end thereof is greater than the outside diameter of the swaging member 4 and the other end thereof is smaller than the outside diameter of the swaging member 4. When the female screw 16 of the fastening member 5 is screw-engaged with the male screw 12 of the joint member 3, the tapered surface 17 contacts an outer periphery of the swaging member 4 fitted around the cylindrical section 13 of the joint member 3 with play, thereby swaging the swaging member 4 inwardly.

A grip 18 for gripping and turning the fastening member 5 by hand is provided on one side of the outer periphery of the fastening member 5 with respect to the center line CL direction.

Figure 2A:
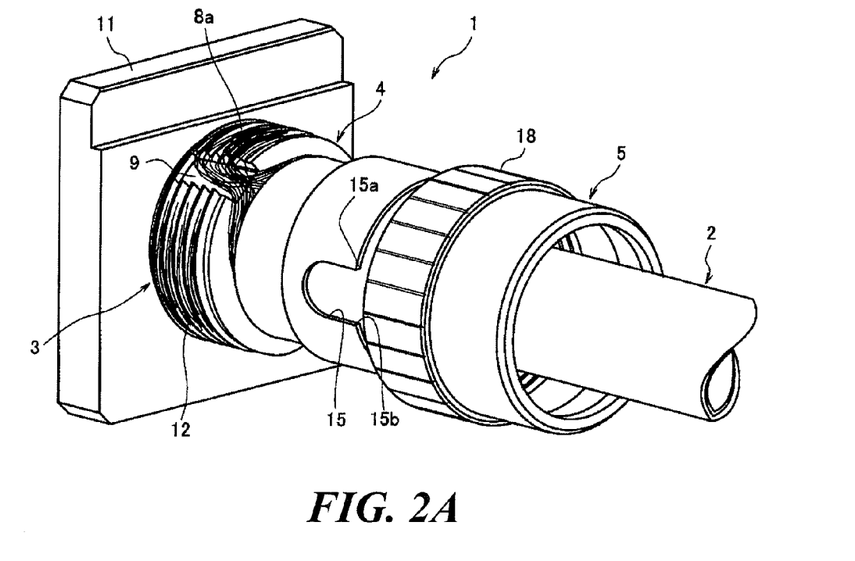
FIGS. 2A and 2B illustrate an example in which tension fibers are laid along a circumferential direction of a screw of a joint member.
Figure 2B:
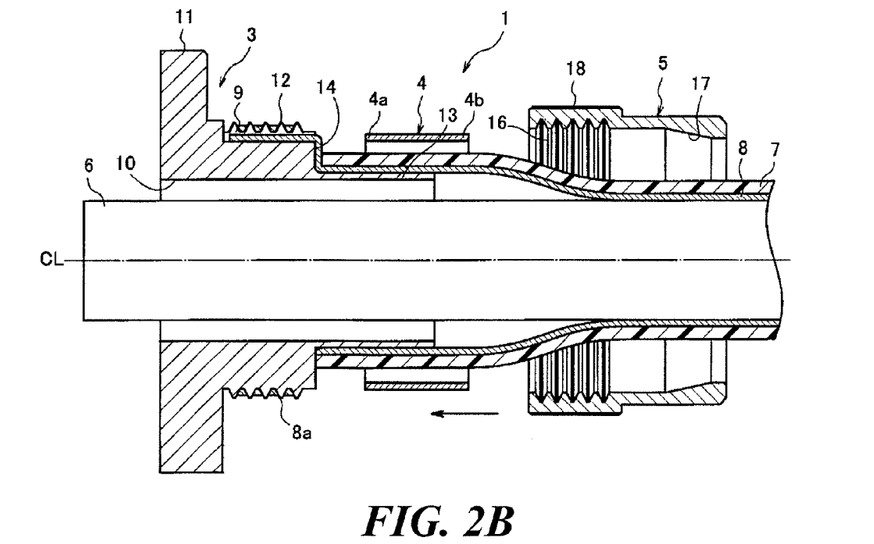

FIGS. 2A and 2B shows an example in which the end portions 8a of the tension fibers 8 are wound around an outer circumference of the male screw 12 of the joint member 3. Specifically, at least one guide groove 9 parallel to an axial direction is formed in an outer surface of the male screw 12, and the exposed end portions 8a of the tension fibers 8 are temporarily collected into the guide groove 9 and wound around the outer circumference of the male screw 12 in a fastening direction (a turning direction) of the fastening member 5. Thus, the end portions 8a are uniformly, dispersedly wound around screw grooves of the male screw 12. A preferred number of turns of the ends portions is about one-half to one turn around the outer circumference of the male screw 12. Two or more guide grooves 9 may be made at uniform intervals so that the end portions 8 are wound around the respective guide grooves 9.

In the embodiment shown in FIGS. 1A and 1B, the end portions 8a of the tension fibers 8 are laid along the axial direction of the male screw section 12 (a direction orthogonal to the screw grooves). In this case, when the male screw 12 of the fastening member 5 is turned in a screw-engaging manner, the end portions 8a may be twisted and entangled with each other due to the contact friction, and variations in fastening and securing may be caused. On the other hand, in FIGS. 2A and 2B, the guide groove 9 is made, and the end portions 8a of the tension fibers 8 are temporarily laid along the guide groove 9. Subsequently, the tension fibers 8 are wound around the outer circumference of the male screw 12. Thus, when the fastening member 5 is turned in a screw-engaging manner, a bundled position (bundled state) of the end portions 8a of the tension fibers 8 becomes regulated within the guide groove 9, and the end portions can be pinched without being twisted. Further, the end portions 8a are involved into the screw grooves due to the contact friction with the fastening member 5, whereby fastening and securing of the end portions 8a can be made more stable. From this viewpoint, the guide groove 9 may be made at a predetermined angle rather than parallel to the axial direction, so long as the guide groove 9 can regulate the bundled position (bundled state) of the end portions 8a of the tension fibers 8 while the end portions 8a are laid along the guide groove 9.

Figure 3A:
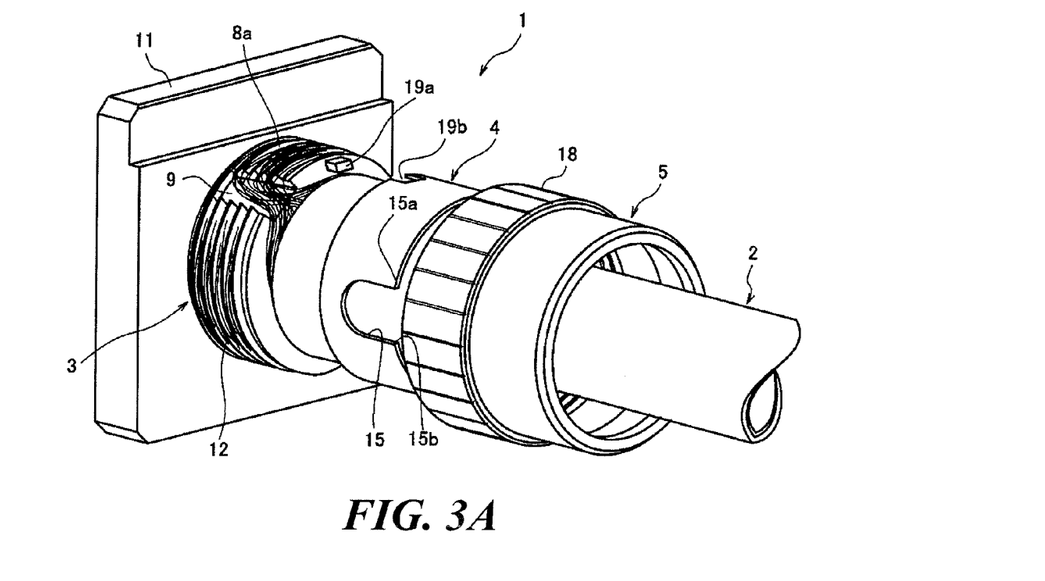
FIGS. 3A and 3B illustrate example protrusion and recess that are formed on a swaging member and the joint member and that engage with each other.

FIGS. 3A and 3B show example of protrusions and recesses that are formed on the swaging member and the joint member and that engage with each other. In FIG. 3A, a protrusion 19a is formed on the step 14 of the joint member 3, while a recess 19b is formed on the swaging member 4. The recess 19b is aligned to and engaged with the protrusion 19a, whereby the swaging member 4 can be attached to the fastening member 5 without the turning operation. A plurality of protrusions 19a and recesses 19b may be made uniformly and dispersedly.

Figure 3B:
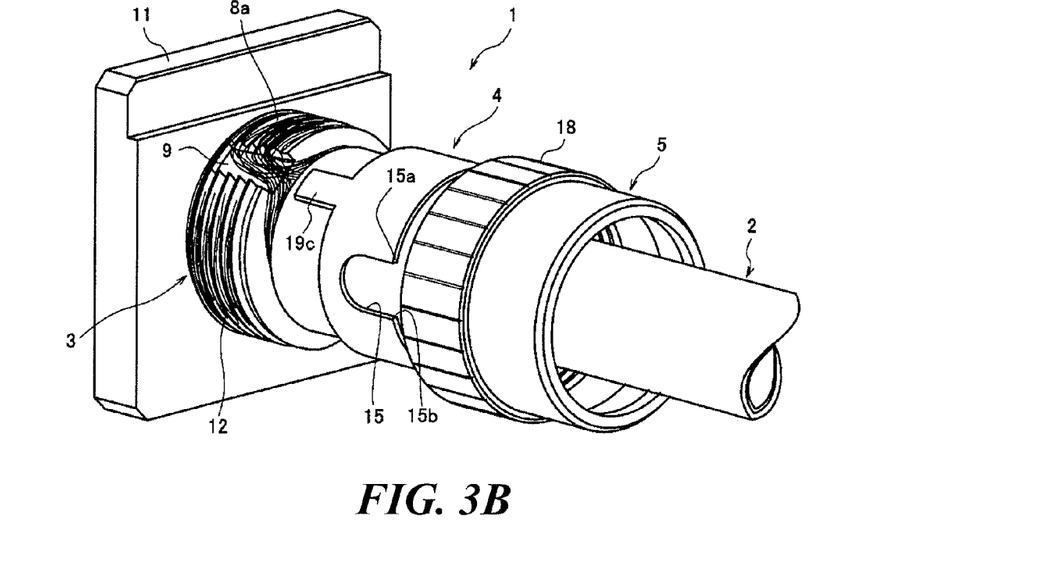

FIG. 3B shows an embodiment in which the recess is formed on the joint member 3 and in which a protrusion is formed on the swaging member 4. The guide groove 9 formed on the male screw 12 of the joint member 3 as shown in FIG. 2 is taken as a recess, and a protruding piece 19c is formed on the swaging member 4. In this case, the swaging member 4 can be assembled such that the end portions 8a of the tension fibers 8 collected into the guide groove 9 are pressed by the protruding piece 19c, thereby preventing protrusion and spread of the end portions 8a and enhancing operability.

In the embodiment shown in FIGS. 1A to 2B, when the fastening member 5 is turned, the swaging member 4 may also turn in conjunction with the fastening member 5 due to the contact friction. When the swaging member 4 turns, the jacket 7 of the fiber optic cable 2 contacting an interior surface of the swaging member 4 may also turn, and a torsion may be given to the tension fibers 8 located inside the jacket 7. By allowing the swaging member 4 to be attached to the joint member 3 without turning, the jacket 7 of the fiber optic cable 2 may be prevented from turning, thereby preventing a torsion of the end portions 8a of the tension fibers 8. Thus, the fiber optic cable 2 can be fastened and secured in a stable, reliable fashion.

Figure 4A:
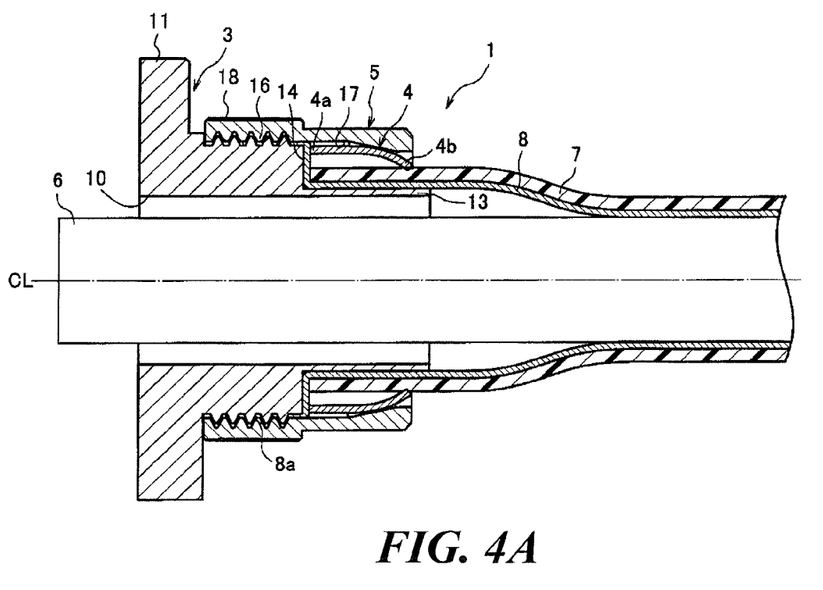
FIGS. 4A and 4B illustrate a state where an end of a fiber optic cable is secured with the fiber optic cable end fixture.
Figure 4B:
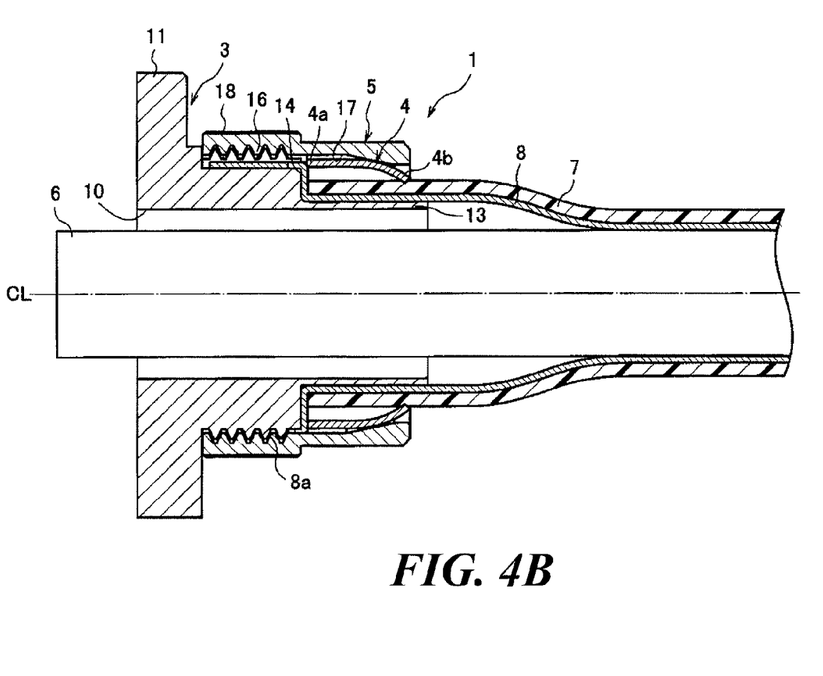
Figure 5A:
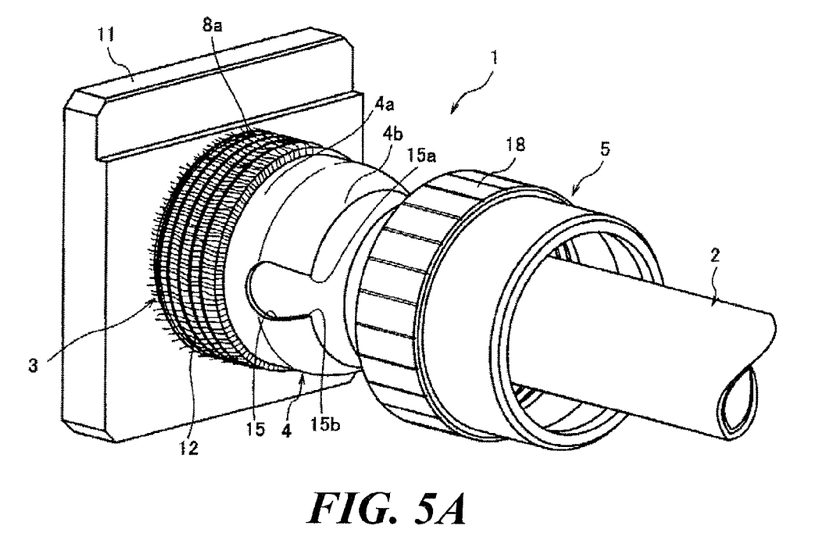
FIGS. 5A and 5B illustrate a state where the swaging member is swaged.
Figure 5B:
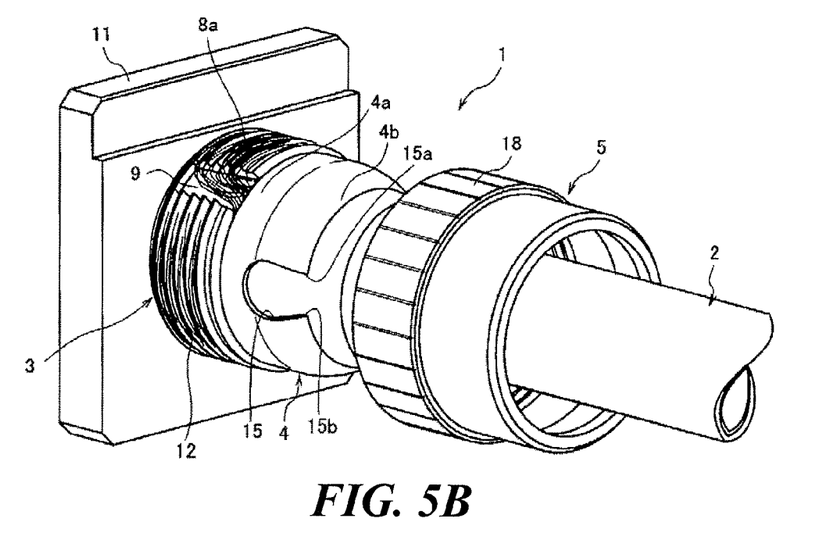

FIGS. 4A and 4B show a state where the fiber optic cable 2 is secured by use of the end fixture mentioned above, and FIGS. 5A and 5B show a state where the fastening member 5 is removed after the end of the fiber optic cable 2 has been secured. FIGS. 4A and 5A correspond to the embodiment shown in FIG. 1. FIGS. 4B and 5B correspond to the embodiment shown in FIG. 2.

In order to secure the fiber optic cable 2 to the foregoing end fixture 1, the fiber optic cable 2 is passed through the fastening member 5 and the swaging member 4 from the end of the fiber optic cable 2. Further, the optical fiber section 6 of the fiber optic cable 2 is passed through the through hole 10 of the joint member 3. The jacket 7 located at the end of the fiber optic cable 2 is expanded, and the expanded jacket 7 is put over the cylindrical section 13 of the joint member 3 along with the tension fibers 8. At this time, in an area ahead of the end of the jacket 7, the end portions 8a of the tension fibers 8 is extended by a predetermined extent to thereby be exposed.

The end portions 8a of the tension fibers 8 exposed from the end of the jacket 7 are laid along the step 14 of the joint member 3. In the embodiment shown in FIGS. 1A and 1B, the end portions 8a are laid along an axially outer circumference of the male screw 12 as shown in FIGS. 4A and 5A. In the embodiment shown in FIGS. 2A and 2B, the end portions 8a of the tension fibers 8 are collected into the guide groove 9 and wound around the outer circumference of the male screw 12 in a predetermined direction as shown in FIGS. 4B and 5B. The swaging member 4 previously put around the fiber optic cable 2 is loosely fitted to the cylindrical section 13 of the joint member 3 covered with the jacket 7. Thus, the jacket 7 of the fiber optic cable 2 and the tension fibers 8 are arranged between the cylindrical section 13 and the inner peripheral surface of the swaging member 4.

Next, the fastening member 5 is moved toward the joint member 3, and the female screw 16 of the fastening member 5 is screw-engaged with the male screw 12 of the joint member 3. Thus, the end portions 8a of the tension fibers 8 are nipped between the male screw 12 of the joint member 1 and the female screw 16 of the fastening member 5. When the fastening member 5 is turned by gripping the grip 18, screw-engagement between the male screw 12 and the female screw 16 proceeds along the screw grooves, and the end portions 8a of the tension fibers 8 nipped between the male screw 12 and the female screw 16 are involved thereinto. Specifically, when the male screw 12 of the joint member 3 and the female screw 16 of the fastening member 5 are screw-engaged with each other, whereupon tensile force arises in the tension fibers 8 in a advancing direction of the joint member 3. So long as the end portions 8a of the tension fibers 8 are wound around and laid along the outer circumference of the male screw 12 in the advancing direction of the joint member 3, tensile force can be stably added to the end portions 8a of the tension fibers 8, so that holding strength can be enhanced.

When the male screw 12 of the joint member 3 and the female screw 16 of the fastening member 5 are screw-engaged with each other by further turning the fastening member 5, the tapered surface 17 of the fastening member 5 comes into contact with the other end 4b of the swaging member 4. As the fastening member 5 keeps turning further, the tapered surface 17 of the fastening member 5 compresses the diameter of the other end 4b of the swaging member 4 to thereby enter a secured state shown in FIGS. 5A and 5B.

When the end of the fiber optic cable 2 is secured by the fiber optic cable end fixture 1, the end portions 8a of the tension fibers 8 are fixed at three points to be described below. First, the end portions 8a of the tension fibers 8 are fixed while subjected to tensile strength of the male screw 12 of the joint member 3 and the female screw 16 of the fastening member 5. Second, the end portions of the tension fibers 8 are secured while nipped between the step 14 and the end 4a of the swaging member 4. Third, the other end 4b of the swaging member 4 is swaged to thereby bite into an press the jacket 7. The tension fibers 8 are nipped and fixed between the jacket 7 and the cylindrical section 13.

The end portions 8a of the tension fibers 8 are fixed at the three points mentioned above and, hence, are firmly secured to the fiber optic cable end fixture 1 without looseness.

When the end of the fiber optic cable 2 is secured by the fiber optic cable end fixture 1, the jacket 7 is secured by the other end 4b of the swaging member 4. At this time, the other end 4b of the swaging member 4 is swaged so that a distance between the sharp edges 15a and 15b of the U-shaped notch 15 becomes smaller. Thus, the sharp edges 15a and 15b bite into the jacket 7, thereby securing the jacket 7.

In the above-mentioned fiber optic cable end fixture 1, when the female screw 16 of the fastening member 5 is screw-engaged with the male screw 12 of the joint member 3, the male screw 12 and the female screw 16 secure the end portions 8a of the tension fibers 8 while imparting tensile strength to the end portions 8a of the tension fibers 8. Further, the other end 4b of the swaging member 4 is swaged by the screwing movement of the fastening member 5 to thereby secure the jacket 7. Specifically, both the tension fibers 8 and the jacket 7 can be simultaneously secured by the turning action of the fastening member 5.

In the fiber optic cable end fixture 1, since the swaging member 4 is swaged by the tapered surface 17 of the fastening member 5, a swaging tool is not necessary, and securing action is facilitated. Since an area of the swaging member 4 to be swaged is determined by the tapered surface 17, exertion of excess force onto the fiber optic cable 2 can be avoided, so that the optical fiber section 6 will not be damaged.

When the fastening member 5 is turned while remaining screw-engaged with the male screw 12 of the joint member 3, the fastening member 5 gradually moves along the axial direction through the screw grooves, and the tapered surface 17 swages the swaging member 4 by the movement of the fastening member 5. Specifically, the swaging member 4 is swaged by the turning force of the fastening member 5. As compared with a case where the fastening member 5 is pushed and inserted in the axial direction, while efforts to turn the fastening member 5 are required, the swaging member 4 can be swaged at small force without use of the swaging tool.

Instead of providing the tapered surface 17 such that the inner diameter of the fastening member 5 is gradually reduced, the other end 4b of the swaging member 4 may be tapered to be reduced in the outside diameter while setting the inner diameter of the other end of the fastening member 5 to be smaller. Further, a tapered surface may be made on both the inner circumference of the fastening member 5 and the outer circumference of the swaging member 4. Specifically, it is sufficient that the tapered surfaces are made such that the tapered surfaces swage the swaging member 4 by the above-mentioned movement of the fastening member 5.

Figure 6:
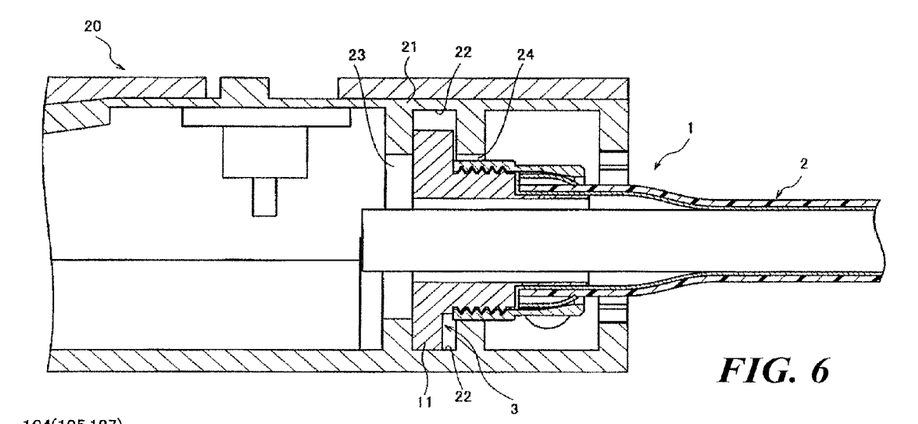
FIG. 6 illustrates a state where the fiber optic cable is secured to a housing of optical equipment with the fiber optic cable end fixture of the present invention.

FIG. 6 cross-sectionally illustrates a state where the fiber optic cable end fixture 1 is secured to optical equipment 20, or the like.

The optical equipment 20 has a housing 21. In the housing 21, a substrate (not shown), or the like, for handling a high-speed electric signal is placed. Further, the optical equipment 20 has a trench portion 22 to which the joint section 11 of the joint member 3 is fitted and a circular opening 23 for allowing insertion of the fiber optic cable 2. A part of the trench portion 22 is detachable. The fiber optic cable end fixture 1 is secured to the housing 21 by fitting the rectangular joint section 11 of the joint member 3 to the remained part of the trench portion 22 and fixing the previously-detached part of the trench portion 22 thereto.

In the fiber optic cable end fixture 1 to which the fiber optic cable 2 is fixed, since the joint section 11 of the joint member 3 radially outwardly extends, a clearance 24 between the fiber optic cable 2 and the opening 23 can be closed. Since the joint section 11 of the joint member 3 has a rectangular shape, when the joint section 11 is fixed to the housing 21, rotation of the fiber optic cable end fixture 1 to which the fiber optic cable 2 is fixed can be prevented.

When the joint member 3 is formed from metal, electromagnetic waves, or the like, emitted from the substrate in the housing 21 can be prevented from leaking outside. Also, outside electromagnetic waves, or the like, can be prevented from entering inside the housing 21.

Although the joint section 11 of the rectangular shape is exemplified, the joint section 11 is not restricted to this shape, so long as the joint section 11 can be fixedly secured to the housing 21 and remain unrotational with respect to the housing 21. For example, the joint section 11 may have a polygonal shape or a circular shape having rotation stop lugs.

Although the present invention has been described in detail by reference to the specific embodiment, it is obvious to those skilled in the art that the present invention be susceptible to various alterations or modifications without departing the spirit and scope of the present invention. The present invention is based on Japanese Patent Application (JP-2010-111911) filed on May 14, 2010, and Japanese Patent Application (JP-2010-263161) filed on Nov. 26, 2010, the entire contents of which are incorporated herein by reference.

DESCRIPTIONS OF THE REFERENCE NUMERALS AND SYMBOLS

1: FIBER OPTIC CABLE END FIXTURE,
2: FIBER OPTIC CABLE,
3: JOINT MEMBER,
4: SWAGING MEMBER,
5: FASTENING MEMBER,
6: OPTICAL FIBER SECTION,
7: JACKET,
8: TENSION FIBER,
8a: END PORTIONS,
9: GUIDE GROOVE,
10: THROUGH HOLE,
11: JOINT SECTION,
12: MALE SCREW,
13: CYLINDRICAL SECTION,
14: STEP,
15: NOTCH,
15a, 15b: SHARP ANGLE,
16: FEMALE SCREW,
17: TAPERED SURFACE,

18: GRIP,
19a: PROTRUSION,
19b: RECESS,
19c: PROTRUDING PIECE,
22: TRENCH,
23: OPENING,
24: CLEARANCE

The invention claimed is:

1. A fiber optic cable end fixture for securing an end of a fiber optic cable,
the fiber optic cable comprising:
an optical fiber section;
tension fibers enclosing the optical fiber; and
a jacket covering the tension fibers,
the fixture comprising:
a joint member;
a swaging member; and
a fastening member,
wherein the joint member has a cylindrical shape in which a through hole that allows insertion of the optical fiber section is formed, the joint member having:
a joint section to be joined to another member;
a male screw along which exposed end portions of the tension fibers are laid; and
a cylindrical section to be covered with the jacket and the tension fibers, the cylindrical section being smaller in diameter than the male screw,
wherein the swaging member has a ring shape and is fitted to the cylindrical section which is covered with the jacket and the tension fibers,
wherein the fastening member has a cylindrical shape and has a female screw at one end of an inner peripheral surface thereof so as to be screw-engaged with the male screw along which the end portions of the tension fibers are laid, and
wherein a tapered surface for swaging the swaging member is formed on at least one of the other end the inner peripheral surface of the fastening member or an outer peripheral surface of the swaging member.

2. The fixture of claim 1,
wherein a swaging facilitation notch is formed in the swaging member.

3. The fixture of claim 1,
wherein a guide groove for laying the end portions of the tension fibers around the male screw along a circumferential direction is formed in the male screw of the joint member.

4. The fixture of claim 1,
wherein a recess and a protrusion that are engageable with each other are formed in the swaging member and the joint member, respectively.

5. The fixture of claim 3,
wherein, as the recess, a guide groove for laying the end portions of the tension fibers around the male screw along a circumferential direction is formed in the male screw of the joint member, and
wherein, as the protrusion, a protruding piece that is engageable with the guide groove of the male screw of the joint member is formed in the swaging member.

6. The fixture of claim 1,
wherein the joint member is formed from a metal.

7. A fiber optic cable end fixing method for securing an end of a fiber optic cable to a housing of an optical equipment by use of a fiber optic cable end fixture,
the fiber optic cable comprising:
an optical fiber section;
tension fibers enclosing the optical fiber section; and
a jacket covering the tension fibers,
the fixture comprising:
a joint member;
a swaging member; and
a fastening member,
the method comprising:
inserting the optical fiber section of the fiber optic cable into a through hole of the joint member having a cylindrical shape, the joint member having: a joint section to be joined to the housing of the optical equipment, a male screw, and a cylindrical section that is smaller in diameter than the male screw, while covering the small-diameter cylindrical section with the tension fibers and the jacket;
laying end portions of the tension fibers exposed from an end of the jacket around a screw-engagement face of the male screw along a circumferential direction via a guide groove formed in the male screw;
fitting the ring-shaped swaging member around an outside of the jacket covering the small-diameter cylindrical section of the joint member; and
screw-engaging the cylindrical fastening member having: a female screw that is engageable with the male screw along which the end portions of the tension fibers are laid; and a tapered surface for swaging the swaging member.

* * * * *